Feb. 1, 1966 M. Y. WOOLFOLK, SR 3,231,897
GOGGLE CONSTRUCTION
Filed April 16, 1963 2 Sheets-Sheet 1

Martin Y. Woolfolk, Sr.
INVENTOR.

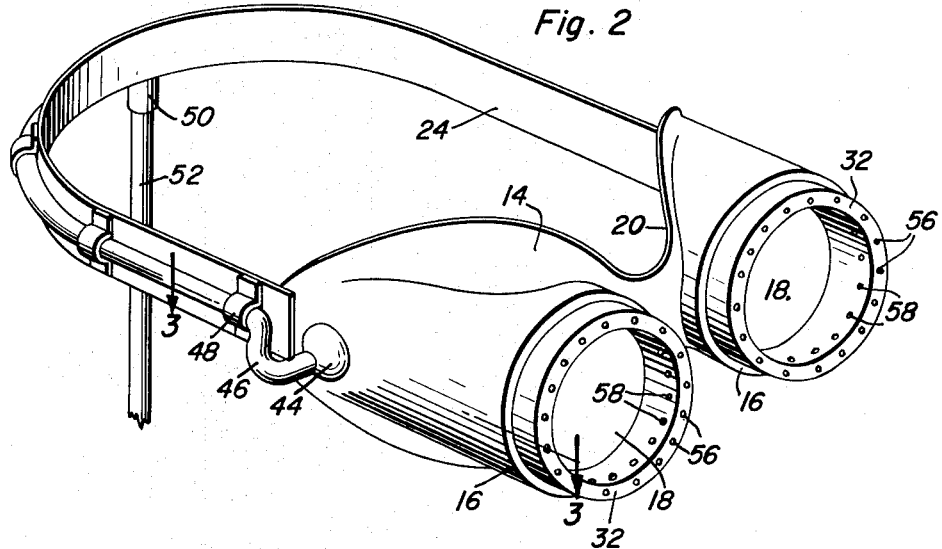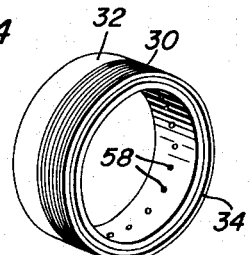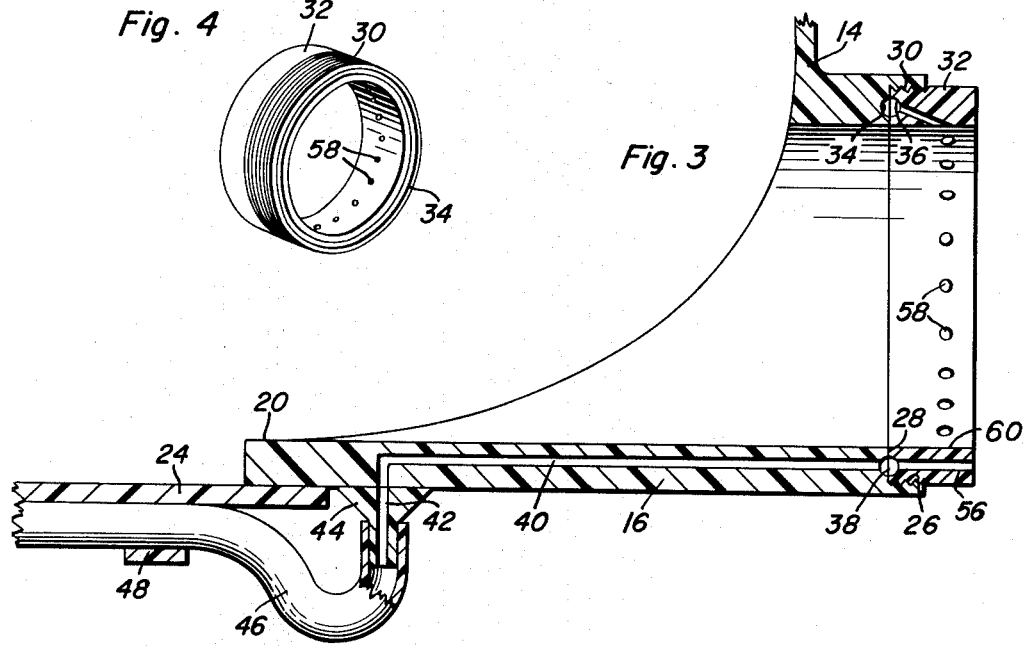

United States Patent Office 3,231,897
Patented Feb. 1, 1966

3,231,897
GOGGLE CONSTRUCTION
Martin Y. Woolfolk, Sr., 3840 Cherry St., Zachary, La.
Filed Apr. 16, 1963, Ser. No. 273,382
10 Claims. (Cl. 2—14)

This invention relates to a novel and useful goggle construction and more specifically to a goggle construction including means by which foreign material in the ambient atmosphere may be blown away from a position in alignment with and closely adjacent the front of the vision openings in the goggle construction.

While many types of goggles are provided with safety glass or shatterproof lenses to prevent objects such as bits of metal and the like from flying into the eyes of the wearer of the goggles and the goggle construction of the instant invention is constructed in a manner enabling shatterproof lenses and the like to be used in connection therewith, the instant invention includes means by which dust particles and the like may be prevented from entering the vision openings of the goggles without using transparent lenses for this purpose.

Although transparent lenses will prevent dust and the like from passing through the vision openings in a pair of goggles, the outer surfaces of the lenses may become rapidly coated with foreign particles such as dust and the like, thus in some instances resulting in a serious impairment of the vision of the wearer of the goggles until such time as he may have an opportunity to remove the goggles and wipe the outer surfaces of the lenses thereof. However, it is not always possible for the wearer of a pair of goggles to remove the goggles at the time the lenses thereof become coated with light obstructing particles and accordingly, the vision of the wearer of the goggles is greatly impaired until such time as he can wipe the outer surfaces of the lenses. Still further, continual wiping of dust particles and the like from the outer surfaces of a pair of lenses will cause the outer surfaces of the lenses to become permanently scratched or pocked. Scratched or pocked lenses can also seriously impair the vision of the wearer of the goggles and it may therefore be seen that the provision of a pair of goggles with lenses for preventing foreign particles such as dust from entering the vision openings in the goggles does not constitute a solution to the impairment of the vision of the wearer of the goggles in all instances.

While some goggle constructions have been provided with means whereby foreign particles such as dust and the like may be continuously removed from the outer surfaces of the lenses of the goggles by effecting a rapid flow of cleaning fluid such as a liquid or air across the outer surfaces of the lenses, these measures do not completely solve the problem of impaired vision inasmuch as liquids flowing across the outer surfaces of the lenses will necessarily cause obscured and distorted vision and jets of air, with which foreign particles from the dusty ambient atmosphere may commingle, directed across the outer surfaces of the lenses has a sand blasting effect thereon.

It is accordingly the main object of this invention to provide a goggle construction including means by which a protective curtain of air is formed about the vision openings in the goggles thereby preventing foreign particles from the ambient atmosphere from passing through the vision openings. In addition, these curtains of protective air will also prevent foreign particles from gaining access to the outer surfaces of the lenses of the goggles, if lenses are provided.

A further object of this invention, in accordance with the immediately preceding object, is to provide a goggle construction including forwardly projecting wall means defining and encircling the vision openings or apertures in the goggles which has a plurality of air outlets formed therein and communicated with a single air supply header passage which in turn may be operatively communicated with a suitable source of compressed air.

Another object of this invention, in accordance with the immediately preceding object, is to provide a goggle construction whose numerous air outlets for forming the curtain of protective air about the vision openings in the goggles are positioned relative to the header portion or passage in a manner that will enable each of the individual air outlets to be formed by drilling a straight passage in the vision opening defining wall means of the goggles. In this manner, the production costs of the goggle construction of the instant invention may be maintained at a minimum.

Still another object of this invention is to provide strap means for supporting the goggle construction from the head of the wearer and including air inlet means communicated with the header portion of the air passage means of the goggles whereby the inlet line from the source of compressed air may be supported from the head strap of the goggle construction rather than from the goggle construction itself.

A final object to be specifically enumerated herein is to provide a goggle construction in accordance with the preceding object which will conform to conventional forms of manufacture, be of simple construction and easy to use so as to provide a device that will be economically feasible, long lasting and relatively trouble free in operation.

These together with other objects and advantages which will become subsequently apparently reside in the details of construction and operation as more fully hereinafter described and claimed, reference being had to the accompanying drawings forming a part hereof, wherein like numerals refer to like parts throughout, and in which:

FIGURE 2 is a perspective view of the goggle construction;

FIGURE 3 is an enlarged fragmentary sectional view taken substantially upon the plane indicated by the section line 3—3 of FIGURE 2;

FIGURE 4 is a perspective view of one of the outer rim portions of the vision opening defining wall means of the goggle construction;

Figure 5:
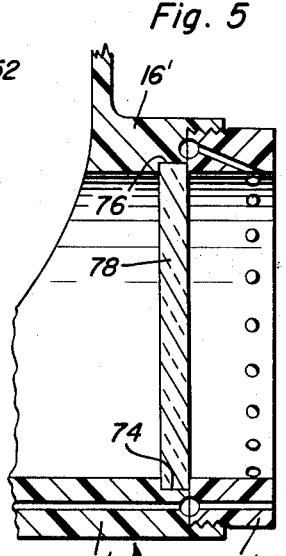
Figure 6:
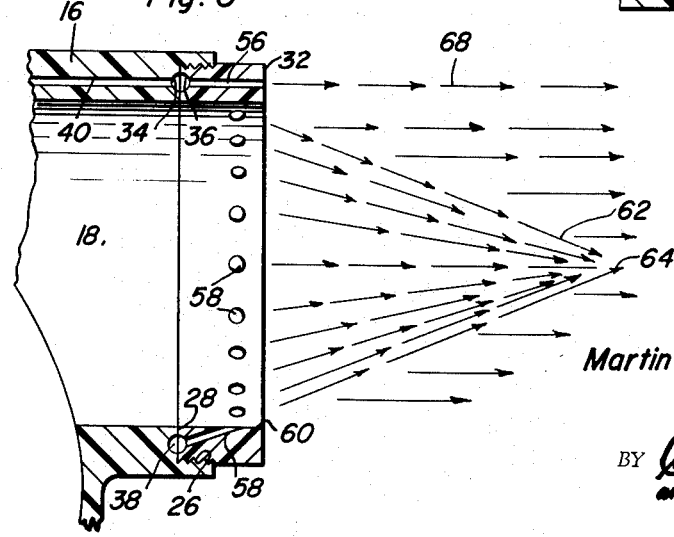

FIGURE 5 is a fragmentary sectional view similar to that of FIGURE 3 but showing a modified form of goggle construction adapted to also support the conventional shatterproof transparent lenses; and FIGURE 6 is a fragmentary enlarged sectional view taken substantially upon a plane passing through the center of one of the vision apertures of the goggle construction and showing the manner in which the air outlets formed in the vision opening defining wall means are capable of forming one or more curtains of protective air about the vision opening.

Figure 1:
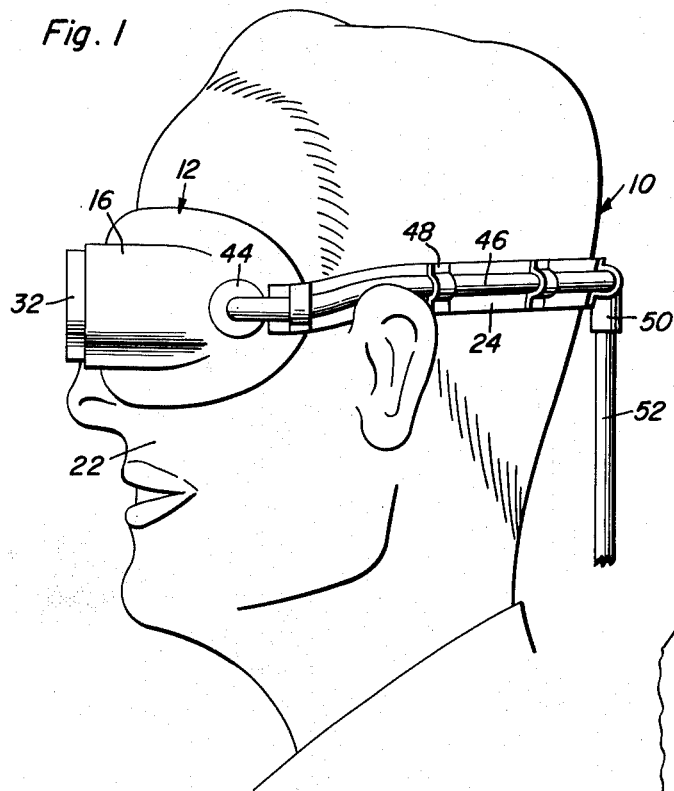
FIGURE 1 is a side elevational view of the head of a person shown with the goggle construction of the instant invention operatively supported therefrom.

Referring now more specifically to the drawings the numeral 10 generally designates the head of a workman which is shown in FIGURE 1 of the drawings having the goggle construction 12 of the instant invention mounted thereon.

The goggle construction 12 includes a main frame or body portion 14 which is formed to conform to the face of the wearer and includes a pair of forwardly projecting generally cylindrical walls 16 which define and extend about open vision apertures 18.

The rear peripheral edges 20 of the frame and body portion 14 are adapted to form a fluid-tight seal with the face 22 of the head 10 and have the opposite ends of the elongated strap member 24 secured to opposite side portions thereof in any convenient manner. It will be noted that the frame or body portion 14 as well as the strap 24 is to be constructed of flexible and resilient material such as rubber. With attention now invited to FIGURE 3 of the drawings it may be seen that the forwardly projecting walls 16 are generally cylindrical and that their inner ends are shaped to conform to the adjacent front surfaces of the body portion 14.

While the goggle construction of the instant invention is illustrated and described herein as including a pair of forwardly projecting walls 16, it is to be noted that a single peripheral wall could be used so as to provide a full vision opening sufficiently wide enough to enable a person to look through one opening with both eyes.

The outer ends of the walls 16 are provided with threaded counterbores 26 that define generally radially inwardly projecting shoulders 28 in the outer ends of the wall 16. An adapter ring 32 which is externally threaded on its base end as at 30 is threadedly engaged in each of the threaded counterbores 26 and is seated against the shoulder 28. The confronting surfaces of the shoulders 28 and the inner ends of the rings 32 are provided with opposing grooves 34 and 36, respectively, which together define header passages 38. Each of the cylindrical walls 16 includes a longitudinally extending manifold passage 40 which terminates at its forward end in the corresponding groove 34 and at its rear end in a right angulated outwardly directed branch passage 42 that opens outwardly through an inlet neck 44 supported from the corresponding side of the body portion 14.

The strap 24 has a delivery conduit 46 mounted thereon by means of suitable clips 48 and a fitting 50 is supported from the rear of the strap 24 and is interposed between two half-sections of the delivery conduit 46 supported by each side portion of the strap 24. The fitting 50 may have the outlet end of a delivery conduit 52 operatively connected thereto whereby a source of air under pressure to which the inlet end of the delivery conduit 52 is communicated may be communicated with the header passages 38.

Each of the rings 32 is provided with a plurality of circumferentially spaced bores 56 which generally parallel the longitudinal axes of the rings 32 and a plurality of inclined bores 58 which open outwardly through the inner surface 60 of the corresponding ring. The rear ends of the bores 56 and 58 open into the corresponding header passage 38 and it may be seen that the bores 58 form a conical curtain 62 of streams of air that converge to a point 64 while the bores 56 form a cylindrical curtain 68 of jets of air about the corresponding vision apertures 18.

With attention now invited to FIGURE 5 of the drawings there may be seen a modified form of goggle construction generally referred to by the reference numeral 72. The goggle construction 72 is substantially identical to the goggle construction 12 with the exception that the outer end of the cylindrical walls 16' thereof are provided with counterbores 74 which together with the rings 32' form annular grooves 76 in which transparent safety lenses 78 may be seated if safety lenses are desired.

In the event the goggle construction is to be constructed so as to have only one vision opening and that vision opening is not substantially cylindrical, the interfitting portions of the single wall of that goggle construction and its ring may comprise detent ridge portions and grooves in lieu of the threaded connections utilized in the goggle constructions 12 and 72.

In operation, should the operator of a piece of heavy earth-moving equipment be moving in an extremely dusty area he may put on either the goggle construction 12 or the goggle construction 72 and open an appropriate valve (not shown) communicating the header passage of that goggle construction with a source of air under pressure. The inclined bores 58 will form an inner cone-shaped curtain of air while the outer bores 56 will form a generally cylindrical curtain of air about the vision openings 18. In this manner, any foreign particles such as dust moving toward the vision openings 18 will be deflected outwardly and forwardly of the vision openings 18. Accordingly, not only will the goggle construction prevent foreign particles such as dust from coming in contact with the eyes of the wearer, but they will prevent any dust from adhering to and lying upon the outer surfaces of the safety lenses of the goggles if safety lenses are provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A goggle construction comprising a frame adapted to be supported from and in contact with the head of the wearer and including forwardly projecting wall means defining and encircling an open vision aperture through which the wearer of the construction may look, said wall means including air passage means having a plurality of outlets closely spaced along said wall means and formed so as to effect a plurality of jets of air about said aperture when said passage means is communicated with a source of air under pressure with said jets of air directed forwardly of said aperture whereby dust in the ambient atmosphere will be blown from in front of the eyes of the wearer of said construction, said wall means including frame-like rim means removably secured to the free edge portions of said wall means with frame-like surfaces of said wall means and said rim means disposed in opposing relation and including continuous grooves opening toward each other defining a header portion of said passage means, said outlets being individually communicated with said header portion.

2. The combination of claim 1 wherein some of said outlets are formed so as to form jets of air which generally parallel the longitudinal axis of the aperture defined by said wall means and the line of straight forward vision through said aperture.

3. The combination of claim 2 wherein others of said outlets are formed so as to form jets of air which are directed forwardly of said aperture but converge toward said longitudinal axis.

4. The combination of claim 1 wherein at least some of said outlets are formed so as to form jets of air which are directed forwardly of said aperture but converge toward the longitudinal axis of the aperture defined by said wall means and the line of straight forward vision through said aperture.

5. The combination of claim 1 wherein said frame includes a pair of separate vision aperture defining wall means each including said passage means and outlets thereby providing a separate vision aperture for each eye of the wearer.

6. The combination of claim 1 wherein said frame includes strap means adapted to engage and support said frame on the head of the wearer of said construction.

7. The combination of claim 6 wherein said strap means supports a portion of said passage means, said portion of said passage means including air inlet means adapted to have the outlet end of an air pressure supply line removably secured thereto.

8. The combination of claim 1 wherein coacting portions of said removable rim means and said wall means define inwardly opening groove means adapted to have transparent lens means removably secured therein.

9. A goggle construction comprising a frame adapted to be supported from and in contact with the head of the wearer and including forwardly projecting wall means defining and encircling an open vision aperture through which the wearer of the construction may look, said wall means including air passage means having a plurality of outlets closely spaced along said wall means and formed so as to effect a plurality of jets of air about said aperture when said passage means is communicated with a source of air under pressure with said jets of air directed forwardly of said aperture whereby dust in the ambient atmosphere will be blown from in front of the eyes of the wearer of said construction, said wall means including frame-like rim means removably secured to the free edge portions of said wall means with frame-like surfaces of said wall means and said rim means disposed in opposing relation and including continuous grooves opening toward each other defining a header portion of said passage means, said outlets being individually communicated with said header portion and substantially straight throughout their entire length, said outlets being disposed entirely within said rim means.

10. A goggle construction comprising a frame adapted to be supported from and in contact with the head of the wearer and including forwardly projecting wall means defining an encircling and open vision aperture through which the wearer of the construction may look, said wall means including air passage means having a plurality of outlets spaced along said wall means and formed so as to effect a plurality of jets of air about said aperture when said passage means is communicated with a source of air under pressure with said jets of air directed forwardly of said aperture whereby dust in the ambient atmosphere will be blown from in front of the eyes of the wearer of said construction, said wall means including a frame-like rim means removably secured to the free edge portion of said wall means with frame-like surfaces of said wall means and said rim means disposed in opposing relation and having grooves formed therein and extending therealong opening toward each other and defining a header portion of said passage means, said outlets being individually communicated with said header portion and being disposed entirely within said rim means.

References Cited by the Examiner

UNITED STATES PATENTS

| 897,290 | 9/1908 | Jacobs | 2—14.6 |
| 1,354,433 | 9/1920 | De-Felice | 2—14.10 |
| 1,464,883 | 8/1923 | Phillips et al. | 2—14.10 X |
| 2,539,284 | 1/1951 | Thomas | 2—14.13 |

FOREIGN PATENTS

| 49,105 | 7/1911 | Austria. |
| 449,456 | 6/1948 | Canada. |
| 476,845 | 5/1929 | Germany. |

JORDAN FRANKLIN, *Primary Examiner.*